Oct. 5, 1943.    O. W. LIVINGSTON    2,331,124
ELECTRIC VALVE TRANSLATING SYSTEM
Filed Sept. 13, 1941

Inventor:
Orrin W. Livingston,
by Harry E. Dunham
His Attorney.

Patented Oct. 5, 1943

2,331,124

UNITED STATES PATENT OFFICE 2,331,124

ELECTRIC VALVE TRANSLATING SYSTEM

Orrin W. Livingston, Scotia, N. Y., assignor to General Electric Company, a corporation of New York Application September 13, 1941, Serial No. 410,660

24 Claims. (Cl. 250—27)

My invention relates to electric translating apparatus and more particularly to electric valve translating apparatus of the type employing electric valve means utilizing a gas or a vapor.

Electric valve apparatus has been applied to many industrial processes where it is highly important to effect energization of a load circuit from an alternating current supply circuit during accurately determinable intervals of time, and where it is equally as important to control accurately the interval of time between successive energizations of the load circuit. In accordance with the teachings of my invention, I provide new and improved control circuits for translating apparatus of this nature wherein a greater degree of precision is obtained than that afforded by the prior art arrangements.

It is an object of my invention to provide a new and improved electric valve translating system.

It is another object of my invention to provide a new and improved control system for electric valve apparatus.

It is a further object of my invention to provide an improved control or excitation circuit for electric valve translating apparatus which is employed to energize a load circuit, such as a welding circuit, from a source of alternating current.

Briefly stated, in the illustrated embodiment of my invention I provide a new and improved control or excitation circuit for a pair of reversely connected electric valves which are connected between an alternating current supply circuit and a load circuit, and in which the conductivities of the electric valve means are controlled in a positive and precise manner to effect energization of the load circuit during accurately determinable intervals of time and whereby the amounts of power transmitted to the load circuit during those intervals of time are also accurately controllable.

Figure 1:
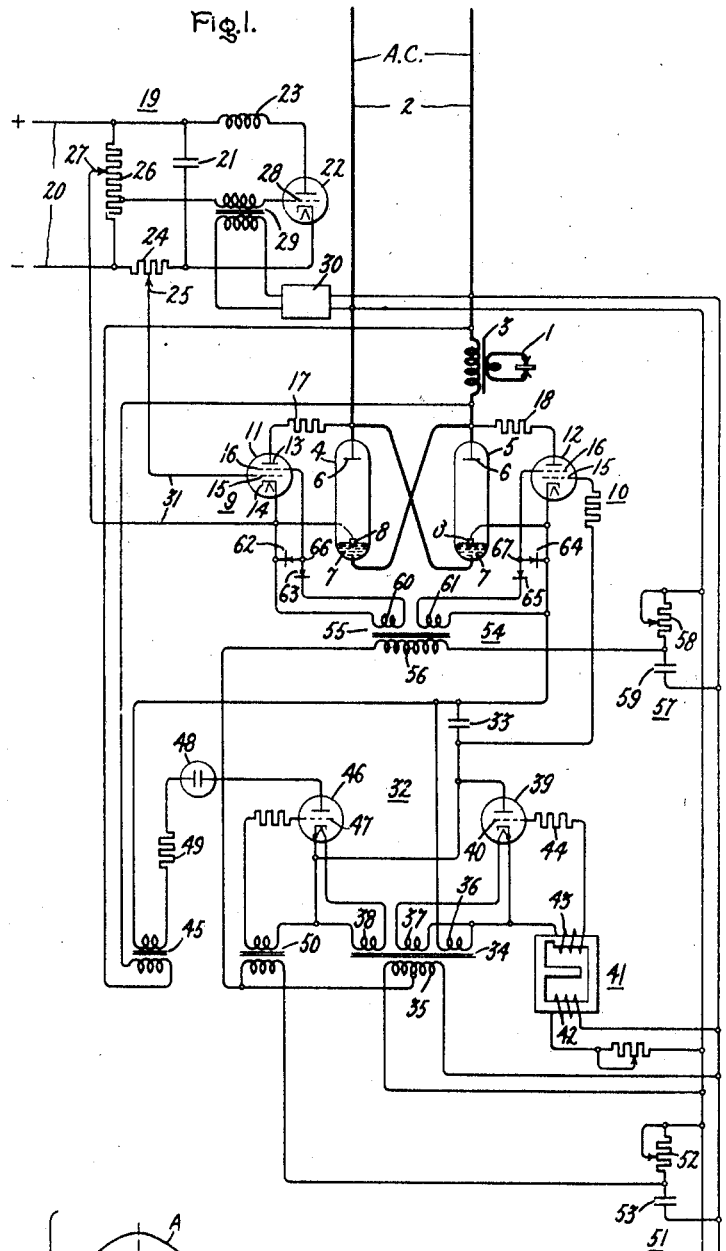
Figure 2:
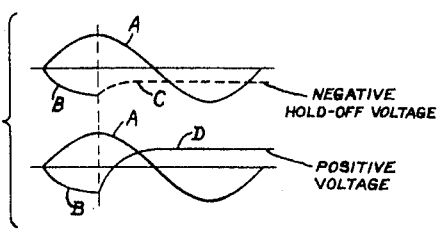

For a better understanding of my invention, reference may be had to the following description taken in connection with the accompanying drawing, and its scope will be pointed out in the appended claims. Fig. 1 diagrammatically illustrates an embodiment of my invention as applied to an electric valve system for energizing a welding system, and Fig. 2 represents certain operating characteristics of the arrangement shown in Fig. 1.

Referring now to Fig. 1 of the accompanying drawing, I have there illustrated by invention as applied to an electric translating system for energizing a load circuit, such as a welding circuit 1, from an alternating current supply circuit 2. The translating system includes a transformer 3 and a pair of reversely connected electric valve means 4 and 5. The electric valve means 4 and 5 are preferably of the type employing an ionizable medium, such as a gas or a vapor, and each includes an anode 6, a cathode such as a self-reconstructing cathode 7 which may be mercury, and an associated control means or member 8 which may be of the immersion-ignitor type preferably constructed of a material, such as boron-carbide or silicon-carbide, having an electrical resistivity relatively large as compared with that of the associated mercury pool.

I provide a pair of excitation circuits 9 and 10 associated with the electric valve means 4 and 5, respectively, and arranged to control the conductivities of the electric valve means 4 and 5 in leading and trailing relationship. That is, the electric valve means 5 is controlled to conduct current during the half cycles immediately following each half cycle of conduction by the electric valve means 4. The excitation circuits 9 and 10 include control means, such as electric discharge devices 11 and 12 respectively, which are also preferably of the type employing an ionizable medium, such as a gas or a vapor. The discharge devices 11 and 12 each include an anode 13, a cathode 14 and control means such as a pair of control grids 15 and 16. The electric discharge devices 11 and 12 may be connected to the anodes 6 of electric valve means 4 and 5, respectively, through current limiting resistances 17 and 18 and when rendered conducting transmit unidirectional current to the associated control members 8.

As a means for controlling the conductivity of the electric valve means 4 through the electric discharge device 11, I employ a suitable control means or pre-set means 19 which controls or pre-sets the number of half cycles of applied anode-cathode voltage during which the electric valve means 4 conducts current. The pre-set means 19 may be designed and arranged to render the electric valve means 4 conducting for a predetermined number of half cycles of voltage of corresponding polarity and to maintain the electric valve means 4 nonconducting during a predetermined number of succeeding half cycles. For the purpose of illustrating the pre-set means 19, I have chosen to represent it as comprising a source of direct current 20, a capacitance 21 which is charged from the source 20, a discharge circuit for the capacitance including an electric valve 22 and an inductance 23. The electric valve 22 discharges the capacitance 21 through a resistance 24 having an adjustable tap 25. The pre-set means 19 also includes a voltage divider comprising a resistance 26 having an adjustable tap 27. If it is desired to synchronize the operation of the pre-set means 19 with respect to the voltage of the alternating current circuit, the control member 23 of electric valve means 22 may be energized by an alternating voltage correlated in phase with respect to the voltage of the supply circuit 2. This may be accomplished by employing a peaking transformer 29 which may be connected to the alternating current circuit 2 through phase shifting means 30. The pre-set means 19 is connected to the control grid 15 of electric discharge device 11 through circuit 31 and controls the conductivity thereof to render the discharge device conducting periodically.

In order definitely to maintain the electric valve means 5 nonconducting except during those half cycles immediately succeeding the half cycles of conduction by electric valve means 4, I provide a control circuit 32 comprising a capacitance 33 which is charged from the alternating current circuit 2 through a transformer 34 including a primary winding 35 and secondary windings 36, 37 and 38. The secondary winding 36 is connected to charge the capacitance 33 through a rectifier 39 of the controlled type having a grid 40. The capacitance 33 and the rectifier 39 are connected to charge the capacitance 33 to impress a negative voltage on control grid 15 of discharge device 12 during the first part of the leading half cycle, that is, during the first part of the positive half cycle of voltage applied to electric valve means 4. I have found that the capacitance 33 may be charged during the first 90 electrical degrees of the positive half cycle applied to electric valve means 4, thereby establishing a negative or hold-off voltage which is impressed on the control grid 15 of discharge device 12 at a time sufficiently early to insure the maintenance of the discharge device 12 in a nonconducting condition in the event the electric valve means 4 does not conduct current. The rectifier 39 may be rendered conducting precisely during the early part of the leading half cycles by suitable means, such as peaking transformer 41 having a primary winding 42 which may be energized from supply circuit 2, and a secondary winding 43 which is connected to the grid 40 through a current limiting resistance 44.

To reverse the polarity of the hold-off voltage produced by capacitance 33 in the event the electric valve means 4 conducts current and thereby to render the discharge device 12 and the electric valve means 5 conducting during the immediately succeeding or following half cycle, I provide a discharge circuit for capacitance 33. This discharge circuit includes in series relation means, such as a transformer 45, which is responsive to the current conducted by electric valve means 4 or responsive to the energization of the load circuit or associated translating apparatus. In the particular embodiment illustrated, the transformer 45 is shown as being connected across the primary winding of power transformer 3. The discharge circuit also includes in series relation an electric discharge device 46 of the controlled type having a grid 47, and in series relation with the anode-cathode circuit thereof I provide voltage responsive means such as a glow discharge valve 48 having a critical minimum ionizing potential. A suitable current limiting resistance 49 may also be employed if desired. The discharge device 46 is rendered conductive during an interval following the charging period of capacitance 33. I have found that the discharge device 46 may be rendered conducting during the second 90 electrical degree interval of the leading half cycle, that is, during the positive half cycle of voltage applied to electric valve means 4. This control may be obtained by means of a transformer 50 which is energized from the supply circuit 2 through a phase shifting circuit 51 including an impedance, such as an adjustable resistance 52 and a capacitance 53. The phase shifting circuit 51 permits adjustment of the phase of the voltage impressed on grid 47 relative to the voltage of the supply circuit and hence determines the time at which discharge device 46 is rendered conductive during the cycles of voltage of the supply circuit.

As a means for controlling the magnitude of the current transmitted to the load circuit 1 during the half cycles of conduction of electric valve means 4 and 5, I provide a circuit 54 which impresses on the control grids 16 of the electric discharge devices 11 and 12 adjustable control voltages which determine the time during the respective positive half cycles of applied anode-cathode voltage at which the electric valve means 4 and 5 are rendered conducting. Of course, it is to be understood that this control is effected only during those intervals of conduction determined by pre-set means 19. Referring to circuit 54 more particularly, I provide a transformer 55 having a primary winding 56 which is connected to be energized from the supply circuit 2 through a phase shifting circuit 57. The phase shifting circuit 57 may be of any conventional type and may include an adjustable impedance, such as a resistance 58, and a capacitance 59. Transformer 54 also includes secondary windings 60 and 61 across which are connected pairs of oppositely poled unidirectional conducting devices 62, 63 and 64, 65, respectively. The common junctures 66 and 67 are connected to the control grids 16 of the electric discharge devices 11 and 12, respectively. In this manner the positive half cycles of the alternating voltages produced by secondary windings 60 and 61 are substantially suppressed so that only the negative or inverse half cycles of alternating voltage are impressed on the grids 16. These negative voltages serve as hold-off voltages and the time at which the discharge devices 11 and 12 are rendered conducting is determined by the time during the cycles of voltage at which the control voltages impressed on grids 16 approach the zero value or become sufficiently positive to permit the voltages produced by pre-set means 19 and circuit 32 to render the discharge devices 11 and 12 conducting.

The operation of the embodiment of my invention shown in Fig. 1 will be explained by considering the system when it is operating to energize the welding circuit 1 intermittently. The periods during which current is transmitted to welding circuit 1 are determined by the setting of the pre-set means 19. The pre-set means 19 may be adjusted by means of contacts 25 and 27 so that current is transmitted to welding circuit 1 during a predetermined number of cycles of voltage of the supply circuit 2 and maintained nonconducting or deenergized during a succeeding predetermined number of cycles. Due to the leading and trailing relationship of the electric valve means 4 and 5 effected by the associated control circuits, it will be appreciated that the electric valve means 5 conducts current during only those half cycles immediately succeeding half cycles of conduction by electric valve means 4.

The pre-set means 19 produces a positive voltage by the discharge of the capacitance 21 through the electric valve 22. This voltage is a periodic voltage of peaked wave form and the initiation of each positive impulse is determined by the time at which the electric valve 22 is rendered conducting by the voltage produced by transformer 29. Upon the generation of a positive impulse of voltage by the pre-set means 19, the electric discharge device 11 will be rendered conducting and will effect the transmission of a unidirectional impulse of current to control member 8 at a time determined by the setting of the phase shift circuit 57. That is, the electric discharge device 11 is rendered conducting conjointly in accordance with the voltage impressed on grid 15 and the voltage impressed on grid 16.

During the first part, that is, during the first 90 electrical degree interval of the leading half cycles of voltage, the capacitance 33 is charged through the circuit including rectifier 39 and secondary winding 36 of transformer 34. The capacitance 33 is charged in a manner to impress a negative half cycle of voltage on the control grid 15 of electric discharge device 12 and the magnitude of this voltage is sufficient to overcome the effect of the control voltage impressed on grid 16, by means of winding 61. Due to the conduction of current by the electric valve means 4 and the incident appearance of voltage across the primary winding of transformer 3, transformer 45 will be energized and the voltage thereof will be of sufficient magnitude to cause discharge of capacitance 33 through glow discharge valve 48 and discharge device 46. The discharge device 46 will have been rendered conductive by virtue of the grid voltage impressed on grid 47 by transformer 50. The phase shifting circuit 51 is adjusted so that discharge device 46 is maintained nonconductive until the second ninety electrical degree interval of the leading half cycle. The discharge of the capacitance 33 through the secondary winding of transformer 45, resistance 49, glow discharge valve 48 and discharge device 46 effectively reverses the polarity of the capacitance 33, thereby rendering electric discharge device 12 in a condition to conduct current to control member 8 of electric valve means 5. The electric valve means 5 will be rendered conducting at a time determined conjointly by the voltage produced by the condenser 33 and the voltage of secondary winding 61 of transformer 55.

From the above explanation, it will be clear that electric valve means 4 and 5 have been rendered conducting during successive half cycles of voltage of supply circuit 2 and that consequently alternating current will be transmitted to welding circuit 1. Furthermore, it will be noted that reversal or change in the polarity of capacitance 33 has been accomplished in a very positive manner to assure precise control of the discharge device 12 and the electric valve means 5 in response to the conduction by the electric valve means 4.

The above described sequence of operation will continue for the number of half cycles of conduction determined by pre-set means 19. Of course, it will be understood that circuit 19 may be arranged so that only one complete cycle of current is conducted to the winding circuit 1.

During those intervals of time in which the voltage produced by pre-set means 19 is not sufficiently positive to render discharge device 11 and electric valve means 4 conducting, circuit 32 operates to maintain a negative hold-off voltage on control grid 15 of discharge device 12 and thereby maintains this discharge device and electric valve means 5 in a nonconducting condition. This control is effected by means of the glow discharge valve 48 which requires the impression across its terminals of a critical minimum voltage. The voltage of capacitance 33 is substantially fixed because device 46 cannot of itself effect substantial discharge of the capacitance 33 even though discharge device 46 is in a conducting condition. Consequently, the voltage of the capacitance 33 may decrease somewhat due to the conduction of the discharge device 46 and valve 48, but in the absence of the energization of transformer 45 discharge of the capacitance 33 is not substantially effected so that the voltage thereof does not substantially decrease or reverse. This phenomenon is accomplished by the difference in the arc initiating voltage or the minimum ionizing voltage and the arc maintaining voltage after conduction of glow discharge valve 48.

The operating characteristics shown in Fig. 2 may be employed to explain more explicitly the operation of the circuit 32. Curve A represents the voltage of the alternating current circuit 2, and the first half cycle, of course, represents the positive half cycle of anode-cathode voltage applied to the electric valve means 4, and the second half cycle accordingly represents the positive half cycle of anode-cathode voltage applied to electric valve means 5. The capacitance 33 is charged during the first 90 electrcal degrees of the leading half cycle of voltage, which is the voltage applied to the anode of electric valve means 4. Curve B represents the voltage appearing across the capacitance 33 due to the charging thereof by the rectifier 39. During the following 90 electrical degree period, the electric discharge device 46 is rendered conductive and the charge of the capacitance 33 will decrease slightly due to a partial discharge of the capacitance 33 through glow discharge valve 48 and the electric discharge device 46. However, as is indicated by curve C, the charge of the capacitance does not reverse and is maintained sufficiently charged to continue the impression of a substantial negative or hold-off voltage on grid 15 of electric discharge device 12. These curves just discussed represent the condition when the electric valve means 4 does not conduct current and when it is desired to maintain the electric valve means 5 nonconducting. On the other hand, if the electric valve means 4 does conduct current, the voltage provided by transformer 45 is of sufficient magnitude to effect substantial discharge of the capacitance 33 through the glow discharge valve 48 and electric discharge device 46, effecting a substantial reversal in the voltage of the capacitance 33 as indicated by curve D. It will be apparent that the voltage produced by capacitance 33 and impressed on grid 15 of discharge device 12 is made positive by the discharge of the capacitance and thereby operates as a positive turn-on voltage cooperating with the component of voltage impressed on grid 16.

The amount of current transmitted by welding circuit 1 is controlled by means of phase shifting circuit 57 which determines the time during the intended half cycles of conduction at which the electric discharge devices 11 and 12 are rendered conducting. As the phase of the voltages produced by windings 60 and 61 is advanced relative to the voltage of the circuit 1, the current transmitted to the load circuit is increased, and conversely as the phase of these voltages is retarded, the current transmitted to welding circuit 1 is decreased.

While I have shown and described my invention as applied to a particular system of connections and as embodying various devices diagrammatically shown, it will be obvious to those skilled in the art that changes and modifications may be made without departing from my invention, and I therefore aim in the appended claims to cover all such changes and modifications as fall within the true spirit and scope of my invention.

What I claim as new and desire to secure by Letters Patent of the United States, is:

1. In combination, an alternating current supply circuit, a load circuit, electric translating apparatus connected between said circuits and comprising a pair of reversely connected electric valve means, a pair of excitation circuits associated with said electric valve means for controlling the conductivity thereof and each including an electric discharge device comprising two control grids, said excitation circuits being arranged in a leading and trailing relationship so that when one of said electric valve means conducts current the other electric valve means conducts current during the succeeding half cycle of voltage of said supply circuit, means for impressing on one of the control grids of the discharge device associated with the leading electric valve means a voltage for rendering said one electric valve means conducting for a predetermined number of half cycles of voltage of said supply circuit, means for impressing on one of the control grids of the discharge device associated with the other electric valve means a negative hold-off voltage, means responsive to the energization of said load circuit for reversing the polarity of said hold-off voltage to permit said other electric valve means to conduct current during each half cycle of voltage of the supply circuit following the half cycles of conduction of said one electric valve means, and means for impressing on the other control grids of the discharge devices periodic voltages to determine the time during the respective positive half cycles of applied anode-cathode voltage at which said electric valve means are rendered conducting.

2. In combination, an alternating current supply circuit, a load circuit, electric translating apparatus connected between said circuits and comprising a pair of reversely connected electric valve means, a pair of excitation circuits associated with said electric valve means and including control means for controlling the conductivity thereof, said excitation circuits being arranged in a leading and trailing relationship so that when one of said electric valve means conducts current the other electric valve means conducts current during the succeeding half cycle of voltage of the supply circuit, means for impressing on the control means associated with one of said electric valve means a voltage to render said one electric valve means conducting during a predetermined number of half cycles of voltage of the supply circuit, means including a capacitance for impressing a hold-off voltage on the control means of the other electric valve means, and means responsive to the energization of said load circuit for reversing the polarity of said hold-off voltage by reversing the charge on said capacitance thereby permitting conduction of said other electric valve means.

3. In combination, an alternating current supply circuit, a load circuit, electric translating apparatus connected between said circuits and comprising a pair of reversely connected electric valve means, a pair of excitation circuits associated with said electric valve means and including control means for controlling the conductivity thereof, said excitation circuits being arranged in a leading and trailing relationship so that when one of said electric valve means conducts current the other electric valve means conducts current during the succeeding half cycle of voltage of the supply circuit, means for impressing on the control means associated with one of said electric valve means a voltage to render said one electric valve means conducting during a predetermined number of half cycles of voltage of the supply circuit, means for impressing on the control means of the other electric valve means a hold-off voltage comprising a capacitance, means including a rectifier for charging said capacitance from said supply circuit, and means for reversing the polarity of said hold-off voltage comprising a transformer and a control electric valve responsive to the current conducted by said one electric valve means for effecting discharge of said capacitance.

4. In combination, an alternating current supply circuit, a load circuit, electric translating apparatus connected between said circuits and comprising a pair of reversely connected electric valve means, a pair of excitation circuits associated with said electric valve means for controlling the conductivity thereof and each including control means, said excitation circuits being arranged in a leading and trailing relationship so that one of said electric valve means conducts current during half cycles of voltage of one polarity and the other electric valve means conducts current only during the half cycles following half cycles of conduction by the one electric valve means, means for impressing on the control means of said other electric valve means a negative hold-off voltage and comprising a capacitance, a rectifier of the controlled type having a grid and a transformer connected to said supply circuit for charging said capacitance through said rectifier from said supply circuit, means connected to said grid for controlling said rectifier to effect charge of said capacitance during the first ninety electrical degree interval of the leading half cycles, and means for discharging said capacitance in order to reverse the polarity of said hold-off voltage thereby permitting conduction of said other electric valve means and including in series relation a control electric valve, a glow discharge valve and a transformer connected to be energized in response to the current conducted by said one electric valve means, and means for controlling the conductivity of said control electric valve to render it conducting during the second ninety electrical degree interval of the leading half cycle.

5. In combination, an alternating current supply circuit, a load circuit, electric translating apparatus connected between said circuits and comprising a pair of reversely connected electric valve means, a pair of excitation circuits associated with said electric valve means and including control means for controlling the conductivity thereof, said excitation circuits being arranged in a leading and trailing relationship so that when one of said electric valve means conducts current the other electric valve means conducts current during the succeeding half cycle of voltage of the supply circuit, means for impressing on the control means associated with one of said electric valve means a voltage to render said one electric valve means conducting during a predetermined number of half cycles of voltage of the supply circuit, means including a capacitance for impressing a hold-off voltage on the control means of the other electric valve means, means responsive to the energization of said load circuit for reversing the polarity of said hold-off voltage thereby permitting conduction of said other electric valve means, and means for impressing on said control means voltages to determine the magnitude of the current conducted to said load circuit during half cycles of conduction by said electric valve means.

6. In combination, an alternating current supply circuit, a load circuit, electric translating apparatus connected between said circuits and comprising a pair of reversely connected electric valve means, a pair of excitation circuits associated with said electric valve means and including control means for controlling the conductivity thereof, said excitation circuits being arranged in a leading and trailing relationship so that when one of said electric valve means conducts current the other electric valve means conducts current during the succeeding half cycle of voltage of the supply circuit, means for impressing on the control means associated with one of said electric valve means a voltage to render said one electric valve means conducting during a predetermined number of half cycles of voltage of the supply circuit, means for impressing on the control means of the other electric valve means a hold-off voltage comprising a capacitance, means including a rectifier for charging said capacitance from said supply circuit, means for reversing the polarity of said hold-off voltage comprising a transformer and a control electric valve responsive to the current conducted by said one electric valve means for effecting discharge of said capacitance, and means for impressing on said control means voltages to determine the magnitude of the current conducted to said load circuit during half cycles of conduction by said electric valve means.

7. In combination, an alternating current supply circuit, a load circuit, electric translating apparatus connected between said circuits and comprising a pair of reversely connected electric valve means each having a control member, a pair of excitation circuits associated with said electric valve means and each including an electric discharge device comprising two control grids, said excitation circuits being arranged in a leading and trailing relationship so that when one of said electric valve means conducts current during a half cycle of voltage of said supply circuit the other electric valve means conducts current during the succeeding half cycle, means for impressing on one of the control grids of the discharge device associated with one of said electric valve means a voltage to render said one electric valve means conducting during a predetermined number of cycles of voltage of said supply circuit, means for impressing on one of the control grids of the other electric discharge device a negative hold-off voltage, means responsive to the conduction of current by said one electric valve means for modifying said hold-off voltage to permit conduction by said other electric valve means, and means for impressing on the other control grids of said discharge devices adjustable control voltages to control the magnitude of the current transmitted to said load circuit.

8. In combination, an alternating current supply circuit, a load circuit, electric translating apparatus connected between said circuits and comprising a pair of reversely connected electric valve means, a pair of excitation circuits associated with said electric valve means for controlling the conductivity thereof and each including a control means, said excitation circuits being arranged in a leading and trailing relationship so that when one of said electric valve means conducts current the other electric valve means conducts current during the succeeding half cycle of voltage of said supply circuit, means for impressing on the control means of the leading electric valve means a voltage to render said leading electric valve means conducting during a predetermined number of half cycles of voltage of said supply circuit, and means for impressing a variable control voltage on the control means for the other electric valve means comprising a capacitance, a charging circuit for said capacitance to charge said capacitance from said supply circuit during the first ninety electrical degree interval of the leading half cycle and a discharge circuit for said capacitance to reverse the polarity of the voltage produced by said capacitance during the second ninety electrical degree of the leading half cycle when said one electric valve means conducts current during the leading half cycle.

9. In combination, an alternating current supply circuit, a load circuit, electric translating apparatus connected between said circuits and comprising electric valve means having a control member, an excitation circuit connected to said control member for controlling the conductivity of said electric valve means and including an electric discharge device having a pair of control grids, adjustable pre-set means for generating a periodic voltage of preestablished periodicity which is independent of the energization of the load circuit and impressing said periodic voltage on one of the control grids to render said electric valve means conducting during different predeterminable numbers of half cycles of voltage of said supply circuit and to maintain said electric valve means nonconducting during a predeterminable succeeding number of half cycles of voltage of said supply circuit, and means for impressing on the other control grid a voltage to control the magnitude of the current transmitted to said load circuit.

10. In combination, an alternating current supply circuit, a load circuit, electric translating apparatus connected between said circuits and comprising electric valve means having a control member, an excitation circuit connected to said control member for controlling the conductivity of said electric valve means and including an electric discharge device having a pair of control grids, adjustable pre-set means for generating a periodic voltage of preestablished periodicity which is independent of the energization of the load circuit and impressing said periodic voltage on one of the control grids to render said electric valve means conducting during different predeterminable numbers of half cycles of voltage of said supply circuit and to maintain said electric valve means nonconducting during a predeterminable succeeding number of half cycles of voltage of said supply circuit, and means for impressing on the other control grid an adjustable phase voltage to control the magnitude of the current transmitted to said load circuit.

11. In combination, an alternating current supply circuit, a load circuit, electric translating apparatus connected between said circuits and comprising electric valve means having a control member, an excitation circuit connected to said control member for controlling the conductivity of said electric valve means and including an electric discharge device having a pair of control grids, adjustable pre-set means for impressing on one of the control grids a periodic voltage to render said electric valve means conducting during different predeterminable numbers of half cycles of voltage of said supply circuit and to maintain said electric valve means nonconducting during a predeterminable succeeding number of half cycles of voltage of said supply circuit, means for impressing on the other of said control grids negative impulses of voltage, and means for adjusting the phase of said negative impulses relative to the voltage of said supply circuit to control the magnitude of the current transmitted to said load circuit.

12. In combination, an alternating current supply circuit, a load circuit, electric translating apparatus connected between said circuits and comprising electric valve means having a control member, an excitation circuit connected to said control member for controlling the conductivity of said electric valve means and including an electric discharge device having a pair of control grids, adjustable pre-set means for impressing on one of the control grids a periodic voltage to render said electric valve means conducting during different predeterminable numbers of half cycles of voltage of said supply circuit and to maintain said electric valve means nonconducting during predeterminable succeeding number of half cycles of voltage of said supply circuit, means for impressing on the other of said control grids negative impulses of voltage comprising a transformer energized from said supply circuit and a unidirectional conducting device for suppressing the positive half cycles of voltage, and phase shifting means connected between said supply circuit and said transformer for controlling the phase relationship of the negative impulses relative of the voltage of said supply circuit.

13. In combination, an alternating current supply circuit, a load circuit, electric translating apparatus connected between said circuits and comprising electric valve means having a control member, an excitation circuit for energizing said control member and for controlling the conductivity of said electric valve means and comprising an electric discharge device having an anode, a cathode, a control grid and a second control grid, means for impressing on the first mentioned control grid a periodic voltage to render said discharge device conducting for a predetermined number of half cycles of voltage of said supply circuit and for maintaining said discharge device nonconductive for a succeeding predetermined number of half cycles of voltage of said supply circuit, means for impressing on said second control grid negative impulses of voltage and comprising a transformer having a winding and a pair of opposed unidirectional conducting devices connected across said winding and the common juncture of said devices being connected to said second control grid, and means including a phase shifting device connected between said supply circuit and said transformer for controlling the phase of said negative impulses relative to the voltage of said supply circuit to control the magnitude of the current transmitted to said load circuit.

14. In combination, an alternating current supply circuit, a load circuit, electric translating apparatus connected between said circuits and comprising a pair of reversely connected electric valve means each having a control member, a pair of excitation circuits connected to said control members for controlling the conductivity of said electric valve means, said excitation circuits being arranged in a leading and trailing relationship so that when one of said electric valve means conducts current the other electric valve means conducts current during the succeeding half cycle of voltage of said supply circuit, each of said excitation circuits including an electric discharge device having a pair of control grids, pre-set means for impressing on one of the control grids of the discharge device associated with the leading electric valve means a periodic voltage to render said electric valve means conducting during a predetermined number of half cycles of voltage of said supply circuit and for maintaining the leading electric valve means nonconducting during a predetermined succeeding number of half cycles of voltage of said supply circuit, and means for impressing on the other control grid a voltage to control the magnitude of the current transmitted to said load circuit.

15. In combination, an alternating current supply circuit, a load circuit, electric translating apparatus connected between said circuits and comprising a pair of reversely connected electric valve means each having a control member, a pair of excitation circuits connected to the control members for controlling the conductivity of said electric valve means and each including an electric discharge device having a pair of control grids, means for impressing on one of the control grids of the discharge device associated with one of said electric valve means a periodic voltage for rendering said one electric valve means conducting during a predetermined number of half cycles of voltage of said supply circuit and for maintaining said one electric valve means nonconducting during a succeeding predetermined number of half cycles of voltage of said supply circuit, means responsive to the current conducted by said one electric valve means for controlling the potential of one of the control grids of the discharge device associated with the other electric valve means so that said other electric valve means conducts current during each half cycle succeeding the half cycles of conduction by said one electric valve means, and means for impressing on the other control grids of said discharge devices voltages for controlling the magnitude of the current transmitted to said load circuit.

16. In combination, an alternating current supply circuit, a load circuit, electric translating apparatus connected between said circuits and comprising a pair of reversely connected electric valve means each having a control member, a pair of excitation circuits connected to the control members for controlling the conductivity of said electric valve means and each including an electric discharge device having a pair of control grids, means for impressing on one of the control grids of the discharge device associated with one of said electric valve means a periodic voltage for rendering said one electric valve means conducting during a predetermined number of half cycles of voltage of said supply circuit and for maintaining said one electric valve means nonconducting during a succeeding predetermined number of half cycles of voltage of said supply circuit, means responsive to the current conducted by said one electric valve means for controlling the potential of one of the control grids of the discharge device associated with the other electric valve means so that said other electric valve means conducts current during each half cycle immediately following the half cycles of conduction by said one electric valve means, and means for impressing on the other control grids of said discharge devices adjustable phase control voltages for controlling the magnitude of the load current.

17. In combination, an alternating current supply circuit, a load circuit, electric translating apparatus connected between said circuits and comprising a pair of reversely connected electric valve means each having a control member, a pair of excitation circuits connected to the control members for controlling the conductivities of said electric valve means and each including an electric discharge device having a grid, means for controlling the potential of the grid of the discharge device associated with one of the electric valve means, and means for controlling the potential of the grid of the other discharge device comprising a capacitance, means for charging said capacitance, and means for discharging said capacitance in response to the current conducted by said one electric valve means for rendering said other electric valve means conducting during the half cycle immediately following each half cycle of conduction by said one electric valve means.

18. In combination, an alternating current circuit, a capacitance, means for charging said capacitance from said alternating current circuit comprising a controlled rectifier, and means for discharging said capacitance including in series relation a controlled electric discharge device and a glow discharge valve having a critical minimum ionizing potential.

19. In combination, an alternating current circuit, a load circuit, electric translating apparatus connected between said circuits and comprising a pair of reversely connected electric valves, means for controlling one of said electric valves including a capacitance, means for charging said capacitance from said supply circuit and including a rectifier, and means for discharging said capacitance in response to the current conducted by the other electric valve means including in series relation a controlled discharge device and a glow discharge valve having a critical minimum ionizing potential.

20. In a control system for producing a control voltage the polarity of which reverses in response to current conducted by one of a pair of reversely connected electric valve means connected to energize a load circuit from an alternating current supply circuit, the combination of a capacitance, means for charging said capacitance from said alternating current circuit and comprising a rectifier of the control type for charging said capacitance during the first 90 electrical degree interval of a cycle of voltage of said supply circuit, and a discharge circuit for said capacitance for reversing the polarity of said capacitance in response to the current conducted by said one electric valve means including in series relation a controlled electric discharge device and a glow discharge valve having a critical minimum ionizing potential.

21. In a system for producing a control voltage the polarity of which reverses in response to the current conducted by one of a pair of reversely connected electric valve means connected to energize a load circuit from an alternating current supply circuit, the combination of a capacitance, means independent of said electric valve means for charging said capacitance from said alternating current circuit and comprising a rectifier of the controlled type for charging said capacitance during the first ninety electrical degrees of a cycle of voltage of said supply circuit, and a discharge circuit for said capacitance for reversing the polarity of said capacitance in response to the current conducted by said one electric valve means including an electric valve having a critical minimum ionizing potential.

22. In a system for producing a control voltage the polarity of which reverses in response to the current conducted by one of a pair of reversely connected electric valve means connected to energize a load circuit from an alternating current supply circuit, the combination of a capacitance, means independent of said electric valve means for charging said capacitance from said alternating current circuit and comprising a rectifier of the controlled type for charging said capacitance during the first ninety electrical degrees of a cycle of voltage of said supply circuit, and a discharge circuit for said capacitance for reversing the polarity of said capacitance in response to the current conducted by said one electric valve means.

23. In a system for producing a control voltage the polarity of which reverses in response to the current conducted by one of a pair of reversely connected electric valve means connected to energize a load circuit from an alternating current supply circuit, the combination of a capacitance, means independent of said electric valve means for charging said capacitance from said alternating current circuit, and a discharge circuit for said capacitance for reversing the polarity thereof in response to the current conducted by said one electric valve means.

24. In combination, an alternating current supply circuit, a load circuit, electric translating apparatus connected between said circuits and comprising electric valve means having a control member, an excitation circuit connected to said control member for controlling the conductivity of said electric valve means and including an electric discharge device having a pair of control grids, adjustable pre-set means for generating a periodic voltage of preestablished periodicity which is independent of the energizatiton of the load circuit and impressing said periodic voltage on one of the control grids to render said electric valve means conducting during different predeterminable numbers of half cycles of voltage of said supply circuit, and means for impressing on the other control grid a voltage to control the magnitude of the current transmitted to said load circuit.

ORRIN W. LIVINGSTON.